US010039998B2

(12) United States Patent
Zhang et al.

(10) Patent No.: US 10,039,998 B2
(45) Date of Patent: Aug. 7, 2018

(54) ANTI-THERMOSENSITIZATION RECTIFICATION TOWER AND THE RECTIFICATION PROCESS THEREOF FOR SEPARATING THERMOSENSITIVE NATURAL SUBSTANCES

(75) Inventors: Zhibing Zhang, Jiangsu (CN); Zheng Zhou, Jiangsu (CN); Gaodong Yang, Jiangsu (CN); Defang Sun, Jiangsu (CN); Ling Zhang, Jiangsu (CN)

(73) Assignee: NANJING UNIVERSITY (CN)

( * ) Notice: Subject to any disclaimer, the term of this patent is extended or adjusted under 35 U.S.C. 154(b) by 1207 days.

(21) Appl. No.: 13/701,840

(22) PCT Filed: Mar. 14, 2011

(86) PCT No.: PCT/CN2011/071750
§ 371 (c)(1),
(2), (4) Date: Jun. 10, 2013

(87) PCT Pub. No.: WO2012/048550
PCT Pub. Date: Apr. 19, 2012

(65) Prior Publication Data
US 2013/0240346 A1 Sep. 19, 2013

(30) Foreign Application Priority Data

Oct. 14, 2010 (CN) .............................. 20100506824

(51) Int. Cl.
*B01D 3/14* (2006.01)
*B01D 5/00* (2006.01)
(Continued)

(52) U.S. Cl.
CPC ............... *B01D 3/28* (2013.01); *B01D 3/148* (2013.01); *B01D 5/006* (2013.01); *B01D 3/14* (2013.01); *B01D 3/322* (2013.01)

(58) Field of Classification Search
CPC .......... B01D 5/0063; B01D 3/28; B01D 3/40; B01D 3/14; B01D 3/322; B01D 5/0036; B01D 5/006; C07C 53/126; C07C 51/44
(Continued)

(56) References Cited

U.S. PATENT DOCUMENTS 1,816,212 A * 7/1931 Coubrough .......... B01D 5/0027
165/113
2,046,554 A * 7/1936 Gay ..................... B01D 5/0009
165/110

(Continued)

FOREIGN PATENT DOCUMENTS

| CN | 1555902 A | 12/2004 |
| CN | 101391152 A | 3/2009 |
| CN | 201280531 A | 7/2009 |

OTHER PUBLICATIONS

International Search Report; PCT/CN2011/071750; Int'l Filing Date: Mar. 14, 2011; Nanjing University, 4 pgs.

*Primary Examiner* — Jonathan Miller
*Assistant Examiner* — Jonathan Luke Pilcher
(74) *Attorney, Agent, or Firm* — Schmeiser, Olsen & Watts, LLP

(57) ABSTRACT

An anti-thermosensitization rectification tower comprising a rectification tower, a T-shaped condenser, a baffle plate, a tower bottom, a falling-film reboiler and a recirculation system, wherein the T-shaped condenser is secured exactly on the top of the rectification tower without any pipeline in between, and the circular baffle plate is installed in the T-shaped condenser; an annular sump located between the rectification tower and the T-shaped condenser for collecting the liquid condensed in the T-shaped condenser and channeling it out of the rectification tower into a liquid-collecting tank, and a centrifugal pump utilized to connect together the tower bottom and the falling-film reboiler to form a high- (Continued)

speed circulation system, wherein the tower bottom is an elongated conduit and the falling-film reboiler is in the form of a stout shell-and-tube heat exchanger is provided.

12 Claims, 4 Drawing Sheets

(51) Int. Cl.
  *B01D 3/28* (2006.01)
  *B01D 3/32* (2006.01)
(58) Field of Classification Search
  USPC .......................................................... 159/6.2
  See application file for complete search history.

(56) References Cited

U.S. PATENT DOCUMENTS

| | | | | |
|---|---|---|---|---|
| 2,167,028 | A * | 7/1939 | McGovern | B01D 5/0009 165/112 |
| 3,655,803 | A * | 4/1972 | Miller | C07C 7/04 203/71 |
| 4,605,783 | A * | 8/1986 | Zinnen | C07C 29/76 568/492 |
| 6,336,997 | B1 * | 1/2002 | Inaba | B01D 3/146 159/49 |
| 6,883,788 | B1 * | 4/2005 | Tagamolila | B01D 3/16 165/DIG. 197 |
| 8,075,742 | B2 * | 12/2011 | Tarancon, III | B01D 3/007 203/67 |
| 2010/0218552 | A1 * | 9/2010 | Tarancon, III | B01D 3/007 62/620 |

* cited by examiner

ANTI-THERMOSENSITIZATION RECTIFICATION TOWER AND THE RECTIFICATION PROCESS THEREOF FOR SEPARATING THERMOSENSITIVE NATURAL SUBSTANCES

FIELD OF TECHNOLOGY

This invention relates to an anti-thermosensitization rectification device for separating thermosensitive natural substances and the process thereof.

BACKGROUND

Natural products, for example, the aromatic substances, exert a very important role in chemical, food and pharmaceutical industries. The said natural aromatic substances may be obtained from animals or plants: those obtained from animals include musk and ambergris while those obtained from plants are more diverse—essential oils, balsams, oleoresins are the most common ones (there are also many artificial aromatic substances, including alcohols and esters). In order to utilize natural substances in chemical, petrochemical, food and pharmaceutical industries, rectification devices are indispensble. The traditional rectification process can be divided into two models: the batch rectification (see FIG. 2) and the continuous rectification (see FIG. 3); the system designed for the batch rectification process includes a batch rectification tower, a heating device and a condensation-recirculation device. Its basic operating procedure goes as follow: feeding all the raw material at once into the tower bottom 29 for heating and evaporation; the gas generated therein emits up through the rectification tower 25 into the condenser 26, wherein it is condensed into liquid; part of the condensed liquid flows back into the rectification tower and is heated again in the tower bottom, and the rest of it is discharged out; after a certain period of heating, the light component of the raw material in the tower bottom is completely separated out, then all the material in the tower bottom is discharged at once without adding any new raw material. Compared with the batch rectification device, the continuous rectification device is installed with a feeding device 40 and a reboiler 35. Its basic operating procedure goes as follow: starting up the whole device and feeding the raw material into the bottom of the rectification tower; heating the material when the liquid reaches a certain level; all the condensed liquid obtained from the tower top flows back and no new raw material is added during this full recirculation stage; subsequently, only part of the condensed liquid channeled out from the condenser 34 flows back into the rectification tower while the rest is discharged out; in addition, part of the liquid flowing into the tower bottom is discharged out as well, only the rest of it is channeled into the reboiler 35 for further heating and evaporation; the gas generated therein flows into the rectification tower 33 and emits upwards in the rectification tower; meanwhile, the raw material should be added continuously to maintain the liquid in the tower bottom at a constant level. Currently, most existing rectification processes adopt the two procedures mentioned above. However, the said procedures are characteristic of long time of heating for the raw material; when they are adopted for separating natural substances, most of which are thermosensitive, the high temperature and long-time heating used in these procedures will lead to such thermosensitization reactions as polymerization, dehydration, oxidation and decomposition, which consequently result in coke deposition, carbon deposition, coloration, discoloration, and damages to aromatic properties of the natural substances; therefore, these reactions cause not only damage to the product quality, but also waste of precious natural resources.

SUMMARY

One aspect relates generally to an anti-thermosensitization rectification tower consisting of a rectification tower, a T-shaped condenser, a baffle plate, a tower bottom, a falling-film reboiler and a recirculation system, wherein the T-shaped condenser is secured exactly on the top of the rectification tower without any pipeline in between; the circular baffle plate is installed in the T-shaped condenser; an annular sump is located between the rectification tower and the T-shaped condenser for collecting the liquid condensed in the T-shaped condenser and channeling it out of the rectification tower into a liquid-collecting tank; a centrifugal pump is utilized to connect together the tower bottom and the falling-film reboiler and thereby to form a high-speed circulation system; the tower bottom is an elongated conduit and the falling-film reboiler is in the form of a stout shell-and-tube heat exchanger.

DETAILED DESCRIPTION

This invention provides a new anti-thermosensitization rectification device for separating natural substances and the process thereof to solve the thermosensitization problem in existing rectification and separation devices. The invention disclosed herein is particularly suitable for separating the compounds that are susceptible to thermosensitization reactions; it can prevent degeneration of the product resulting from thermosensitization reactions and therefore maintains the high intrinsic properties of the target product.

Figure 1:
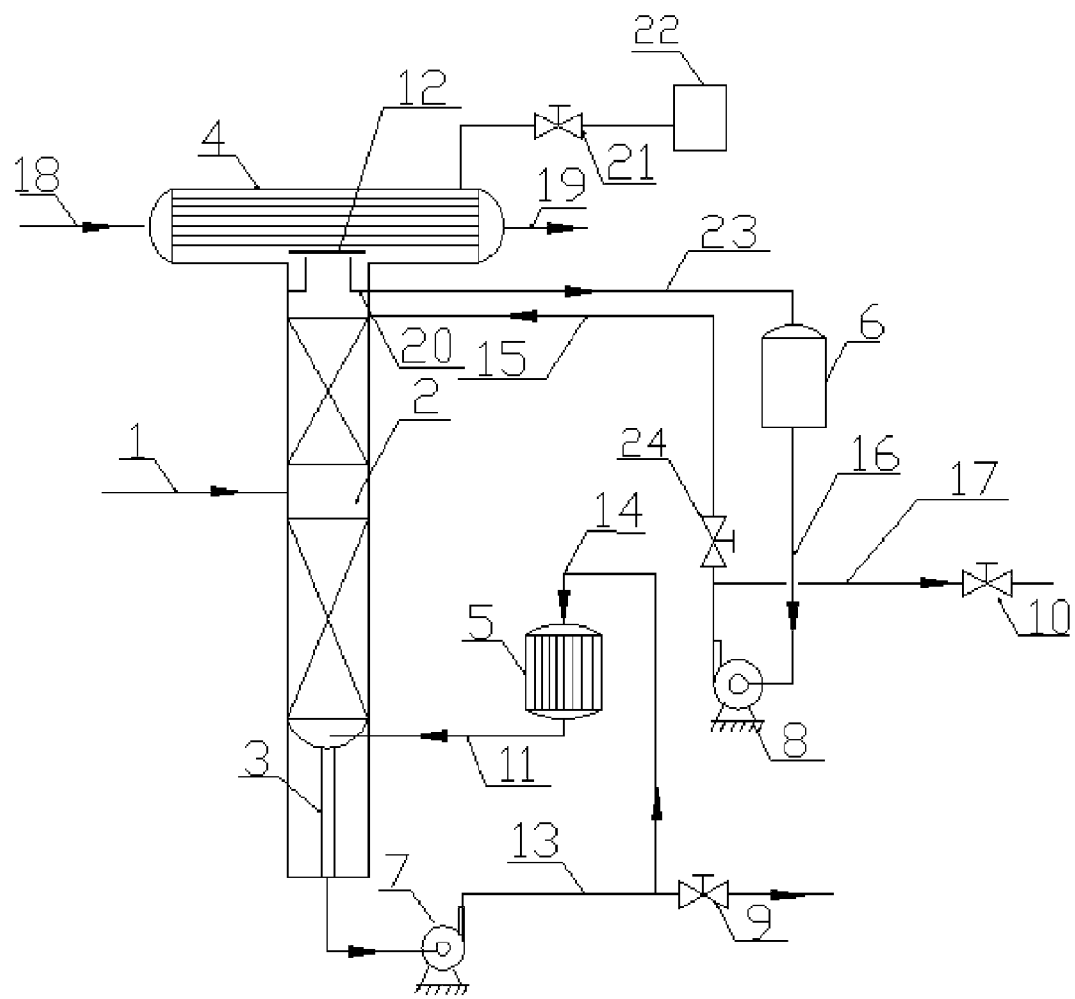
FIG. 1 is the anti-thermosensitization rectification device and the process thereof disclosed in this invention, wherein 1 feeding inlet, 2 rectification tower, 3 tower bottom, 4 T-shaped condenser, 5 falling-film reboiler, 6 liquid-collecting tank, 7, 8 centrifugal pumps, 9, 10, 21, 24 valves, 11, 13,14 pipes transporting the mixture to the tower bottom; 12 baffle plate, 15, 16, 23 pipes transporting the mixture to the tower top; 17 outlet for discharging the condensed liquid from the tower top; 18, 19 pipes for coolant transportation; 20 sump, 22 vacuum system.

The technical solutions adopted in this invention are as follows:

an anti-thermosensitization rectification tower as shown in FIG. 1, comprising a rectification tower 2, a T-shaped condenser 4, a baffle plate 12, a tower bottom 3 and a falling film reboiler 5, wherein the T-shaped condenser 4 is secured exactly on the top of the rectification tower 2 without any pipeline or transitional section in between; the circular baffle plate 12 is installed in the T-shaped condenser 4; the condensed liquid in the T-shaped condenser 4 cannot flow back into the rectification tower 2, and the uncontrollable inner recirculation is therefore prevented; an annular sump 20 is located between the rectification tower 2 and the T-shaped condenser 4 for collecting the liquid condensed in the T-shaped condenser 4 and channeling it out of the rectification tower into a liquid-collecting tank 6; the rectification tower 2 is a plate or packed tower, preferably a packed tower; a centrifugal pump 7 is utilized to connect together the tower bottom 3 and the falling-film reboiler 5 and thereby to form a highspeed circulation system; the tower bottom 3 is an elongated conduit and the falling-film reboiler 5 is in the form of a stout shell-and-tube heat exchanger;

the said anti-thermosensitization rectification tower, wherein the said T-shaped condenser 4 and the rectification tower 2 are connected together by means of a flange; the coolant of the T-shaped condenser 4 is introduced in through a coolant inlet pipe (18) and channeled out through a coolant outlet pipe (19);

the said anti-thermosensitization rectification tower, wherein the said sump (20) is located at the top outlet of the rectification tower 2; the brim of the sump (20) is higher than the connecting section between the rectification tower 2 and the T-shaped condenser 4, and is spaced apart from the baffle plate 12 such that the liquid condensed in the T-shaped condenser 4 can only flow into the sump 20;

the said anti-thermosensitization rectification tower, wherein the said baffle plate 12 is welded on the rectification tower 2 above the connecting section between the rectification tower 2 and the T-shaped condenser 4, and is spaced apart at the top of the rectification tower 2 so that the up-going steam can emit through; the circular baffle plate 12 overlaps the inner brim of the sump 20 so that the liquid condensed in the T-shaped condenser 4 can only flow into the sump 20, rather than back into the rectification tower 2;

the said anti-thermosensitization rectification tower, wherein the said tower bottom 3 is a elongated conduit, the volume of which is ⅒-⅟₅₀ of the traditional one; such a design greatly shortens the retention time of the processed natural substances therein and consequently prevents their long-time retention in the hot condition;

the said anti-thermosensitization rectification tower, wherein the said falling-film shell-and-tube reboiler 5 is in the form of a stout cylinder (height-diameter ratio is lower than 1); under the function of the liquid circulation pump installed under the tower bottom, the average top-down retention time of the liquid in the shell-and-tube is extremely short (about 0.1-3 second); therefore, though the fall-filming reboiler is the hottest place of the whole process, the very short contact time between the processed natural substances and the heating wall of the reboiler can effectively prevent the occurrence of thermosensitization reactions; in contrast, the reboiler in the traditional rectification tower is characteristic of long time heating of the processed natural substances, which makes thermosensitization reactions unavoidable;

the said anti-thermosensitization rectification tower, wherein the said recirculation system comprises the pipe 23, the liquid-collecting tank 6, the pipe 16, the centrifugal pump 8 and the pipe 15; the liquid-collecting tank 6 is used to collect the liquid flowing out of the sump 20; part of the liquid in the liquid-collecting tank 6 is channeled by the centrifugal pump 8 back into the 25 rectification tower 2 for recirculation while the rest of the liquid is discharged out as the final product;

a rectification process for separating thermosensitive natural substances as shown in FIG. 1; wherein the process comprises the steps as follows:

step 1. reducing the pressure in the whole rectification tower to the required operating level (normally, the operating pressure is adjusted to the point lower than the thermosensitization temperature of the processed substances) by means of the vacuum system 22; introducing the mixed substances through the pipe 1, the rectification tower 2 into the tower bottom 3; turning on the pump 7 when the liquid reaches a certain level and pumping the mixed substances in the tower bottom 3 through the pipes 13-14 into the falling-film reboiler 5 for heating; due to the pressure difference, the gas-liquid mixture generated therein flows through the pipe 11 into the rectification tower 2 for rectification processing;

step 2. the gas flows into the T-shaped condenser 4 and is cooled into liquid therein; the liquid, due to the existence of the baffle plate 12, can only flow over the edge of baffle plate 12 into the sump 20, and not back into the rectification tower and the liquid then flows through the pipe 23 into the liquid-collecting tank 6; the liquid is then channeled through the pipe 16 to the centrifugal pump 8 and is pumped back into the rectification tower 2 for establishing a full recirculation; the T-shaped condenser 4 is installed exactly on the top of the rectification tower 2, and the up-going gas flows into the condenser 4 from its middle section; since there is almost no transitional distance from the top of the rectification tower 2 to the condenser 4, the gas from the rectification tower 2 is immediately condensed into liquid and cooled down below the thermosensitization point of the substances; the condensed liquid can only flow into the sump 20 through the edge of the baffle plate 20 due to the existence of the baffle plate 12;

step 3. after a certain time of the full recirculation and establishment of the reaction equilibrium, turning on the valve 9 and the valve 10 for discharging out the final product; the light component of the distillate at the top of the tower is discharged out from the valve 10, and the higher boiling-point, heavy component of the distillate at the tower bottom 3 is discharged out from the valve 9; meanwhile introducing the new raw material from the pipe 1 to maintain the liquid in the tower bottom 3 at the normal level so that the whole system reaches its continuous operation stage.

Figure 2:
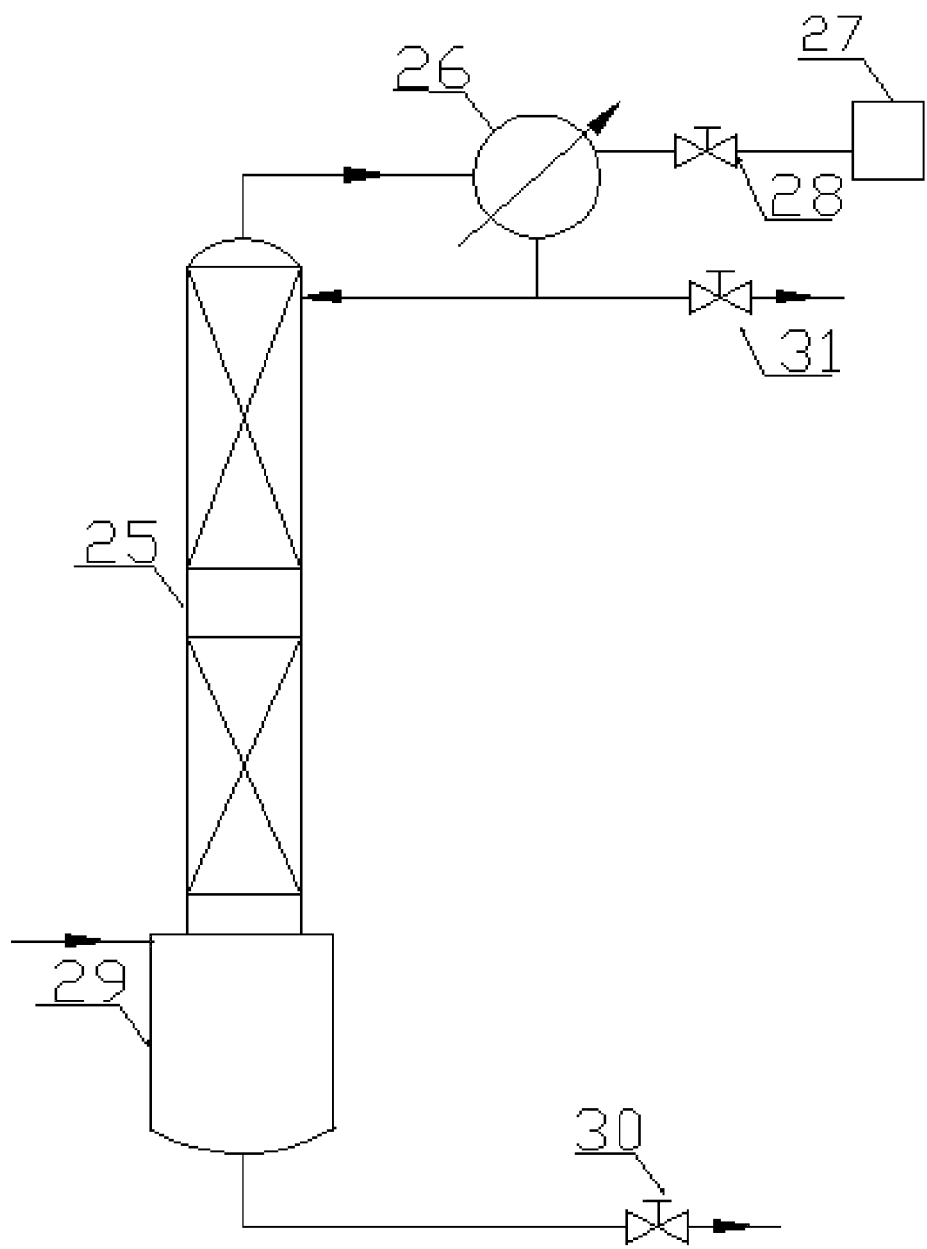
FIG. 2 is a traditional batch rectification device, wherein 25 rectification tower, 26 condenser, 27 vacuum system, 28, 30,31 valves, 29 tower bottom.
Figure 3:
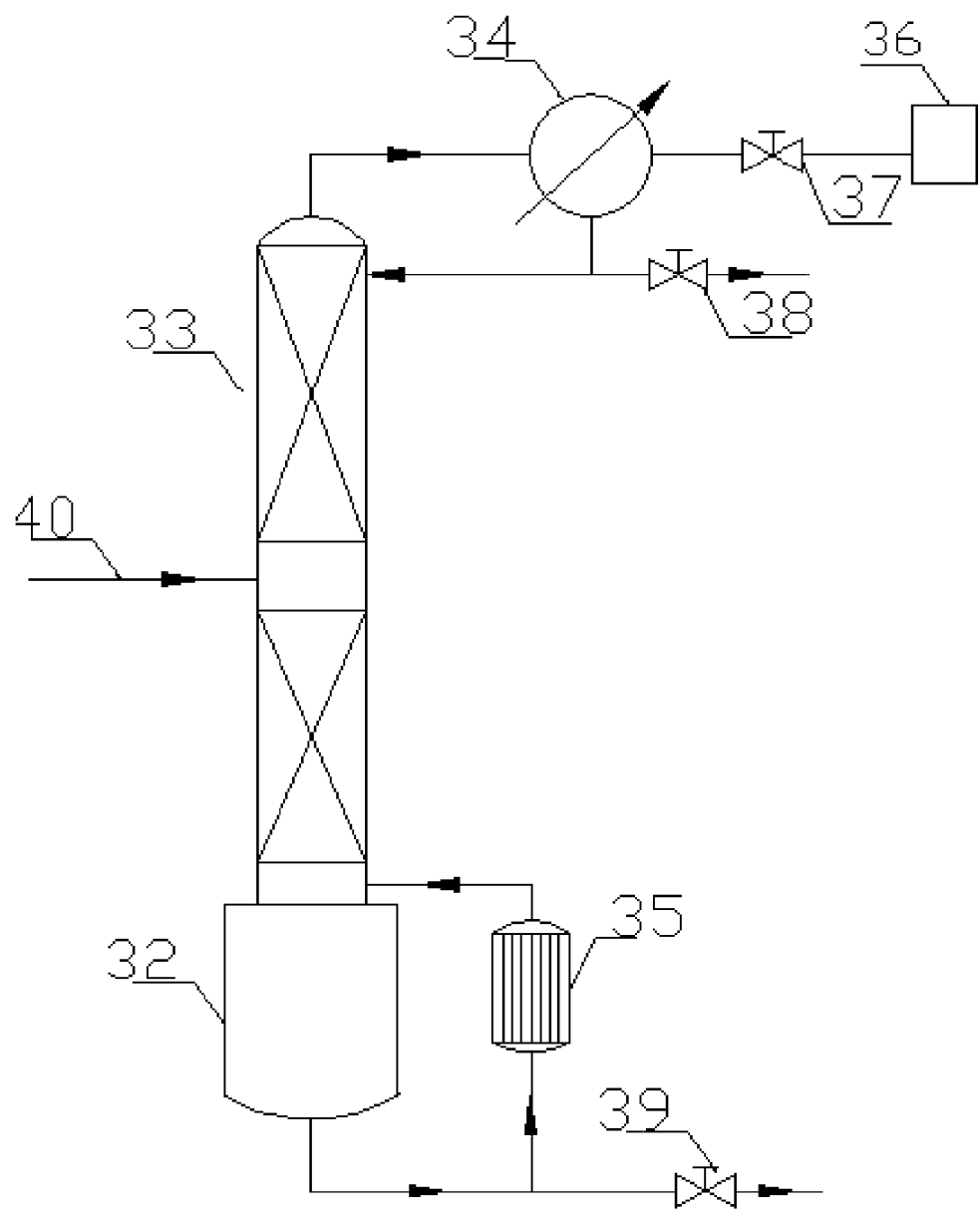
FIG. 3 is a traditional continuous rectification device, wherein 32 tower bottom, 33 rectification tower, 34 condenser, 35 reboiler, 36 vacuum system, 37, 38,39 valves, 40 feeding inlet.

This invention has the following benefits:

1. in contrast with traditional rectification devices (shown in FIG. 2 and FIG. 3), the anti-thermosensitization rectification tower disclosed herein (shown in FIG. 1) adopts a T-shaped condenser, which greatly shortens the distance between the top of the rectification tower and the condenser, and consequently reduces the retention time of the gas from the rectification tower to the condenser to its maximum degree; the steam emitting from the rectification tower quickly reaches the tower top and is immediately condensed into liquid and cooled down below the thermosensitization point of the substances contained therein; such a arrangement can effectively prevent the occurrence of thermosensitization;

2. a circular baffle plate and an annular sump are installed between the T-shaped condenser and the rectification tower of the anti-thermosensitization rectification tower disclosed herein; such a design allows the condensed liquid flowing from the T-shaped condenser only into the sump, which consequently prevents the condensed liquid flowing directly back into the rectification tower and facilitates an exact control over the recirculating liquid;

3. in contrast with traditional rectification devices (shown in FIG. 2 and FIG. 3), the tower bottom of the anti-thermosensitization rectification tower disclosed herein is designed in the form of an elongated conduit; such a design greatly reduces its volume down to 1/50-1/10 of a traditional tower bottom; in addition, the circulating pump installed under the tower bottom also reduces the retention time of the mixture in the tower bottom down to 1/50-1/10 of that in a traditional tower bottom; therefore, the long time heating of the mixture in the tower bottom is avoided, which greatly prevents the occurrence of thermosensitization reactions;

4. a falling-film reboiler in the form of a stout shell-and-tube heat exchanger is adopted in the said anti-thermosensitization rectification tower (shown in FIG. 1); in contrast with the common shell-and-tube reboiler 35 used in traditional rectification devices, the liquid flowing top-down in the falling-film shell-and-tube reboiler renews its evaporating surface continuously, which guarantees excellent heat transfer effect and quick evaporation speed; meanwhile, the contact time of the liquid and the hot inner surface of the shell-and-tube heat exchanger is extremely short, which effectively prevents overheating of the liquid-phase substances, and consequently prevents the occurrence of thermosensitization reactions in the heat exchanger.

SPECIFIC EMBODIMENTS

Embodiment 1

Introducing the mixture of crude eucalyptus oil and ethanol through the pipe 1and the rectification tower 2 into the tower bottom 3; the rectification tower 2 is 0.15 m in diameter with the theoretical plate number of 40; the total volume of the tower bottom 3 is 50L and its height-diameter ratio is 3:1; turning on the vacuum system 22 and reducing the pressure of the whole rectification system to 400 mmHg; starting to heat the falling-film reboiler 5; the total volume of the said falling-film reboiler is 500 L and the temperature of the heating medium is 140°; meanwhile turning on the centrifugal pump 7 to establish the liquid circulation of the tower bottom 3; the flow rate of the centrifugal pump is 40 m$^3$/h; the gas generated in the falling-film reboiler 5 flows with the unevaporated liquid into the bottom of the rectification tower 2, where the gas-phase is distilled by the rectification tower 2; it reaches the tower top and is immediately condensed into liquid in the T-shaped condenser 4; the condensed liquid flows into the sump 20 and then into the liquid-collecting tank 6 through pipes; the condensed liquid in the liquid-collecting tank 6 is pumped back into the rectification tower 2 by the centrifugal pump 8 for establishing a full recirculation; After a certain period of the full recirculation and establishment of the equilibrium of the whole tower system, starting to discharge out the product; turning on the valve 9 and the valve 10 and keeping the reflux ratio at 2/5; meanwhile feeding the mixture of crude eucalyptus oil and ethanol to maintain the liquid in the tower bottom at the set level; the rectification operation thereafter turns to its continuous stage; the purity of 1,8-cineole produced from the tower bottom is 99.7% and the produced volume is 300 kg/h; in contrast with common distillation methods, the retention time of the mixture in the tower bottom is greatly shortened in this invention, only about 1/40-1/30 of that of the common continuous distillation, or equivalent to 1/200-1/100 of that of the common batch distillation; the method adopted herein can almost completely prevent the thermosensitization reactions; as a result, the recovery of qualified 1,8-cineole is above 98.5%, 3 percentage higher than that obtained through the common continuous distillation; in addition, the product obtained through the method disclosed herein is characteristic of pure aroma and water-clear transparency.

Embodiment 2

Figure 4:
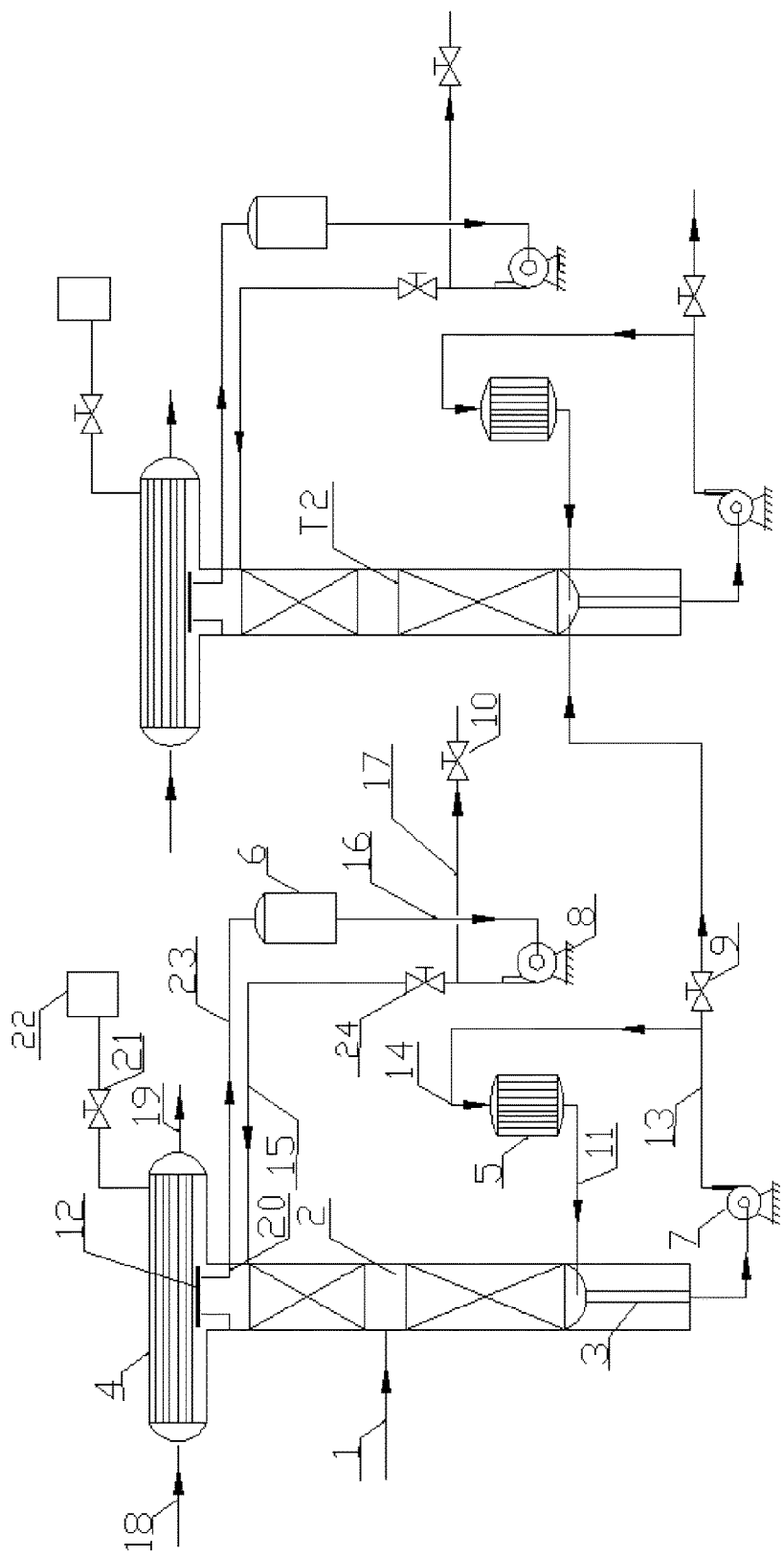
FIG. 4 is a two-tower configuration of the anti-thermosensitization rectification device and the process thereof disclosed in this invention (see Embodiment 2 and Embodiment 3), wherein 2 rectification tower A, T2 rectification tower B.

A two-tower configuration is adopted to separate turpentine extracted from Chinese red pines; the device structure and operating method (shown in FIG. 4) are similar to those adopted in Embodiment 1. Introducing the turpentine extracted from Chinese red pines into the rectification tower A2 of the rectification system; the rectification tower A2 is 0.15 m in diameter with the theoretical plate number of 40; the total volume of the tower bottom 3 is 50L and its height-diameter ratio is 3:1; the pressure in the rectification tower A2 is adjusted to 40 mmHg, and the heating temperature of the falling-film reboiler 5 is kept at 140°; the flow rate of the centrifugal pump is 30 m$^3$/h; after a certain period of the full recirculation and temperature stabilization of the whole tower system, controlling the temperature of the tower top of the rectification tower A1 around 90° and starting to discharge out α-pinene from the tower top; the produced volume is 180 kg/h and the purity of the product is above 98%; the yield of α-pinene is above 99.5%, 8 percentage higher than that obtained by the common continuous distillation; the mixture in the tower bottom of the rectification tower A2 is pumped by the pump 7 into the rectification tower BT2 for further separation; the pressure in the rectification tower BT2 is adjusted to 40 mmHg, and the heating temperature of the falling-film reboiler is kept at 150°; the flow rate of the centrifugal pump is 30 m$^3$/h; the α-pinene is discharged out from the tower top of the rectification tower BT2; the produced volume is 80 kg/h; the heavy component of the turpentine, so-called the heavy oil, is discharged out from the bottom of the rectification tower BT2; the purity of α-pinene produced therein is above 98.5% and the yield is above 99.0%, 7 percentage higher than that of the common continuous distillation.

In contrast with the common continuous distillation, the retention time of the mixture in the two tower bottoms is greatly shortened in this invention, only about 1/60-1/50 of that of the common continuous distillation, or equivalent to 1/500-1/400 of that of the common batch distillation; the method adopted herein can almost completely prevent the thermosensitization reactions.

Embodiment 3

The operating method adopted herein is similar to Embodiment 2: introducing the mixture of dihydromyrcenol, dihydromyrcene and isopropanol into the rectification system; turning on the vacuum system and keeping the operating pressure in the rectification tower A2 at 20 mmHg (the rectification tower A is 0.15 in diameter with the theoretical plate number of 40); keeping the heating temperature of the falling-film reboiler 5 at 140 and the flow rate of the centrifugal pump 7 at 40 m$^3$/h; after a period of the full recirculation and temperature stabilization of the whole rectification system, starting to discharge out dihydromycenol from the bottom of the rectification tower A2 (the produced volume is 300 kg/h and the reflux ratio is 2/5); the purity of the dihydromycenol is 95.6%; leading the dihydromycenol produced therefrom into the rectification tower BT2 for further rectification, and the purity of the dihydromyrcenol discharged out from the top of the rectification tower BT2 is above 99.5%; the anti-thermosensitization device and the process thereof adopted in this invention ensure that the average retention time of the mixture in the two towers is about 1/50 of that of the common continuous distillation, and about 1/400 of that of the common batch distillation; as a result, the yield of dihydromyrcenol is above 92%, 14 percentage higher than that adopting the common continuous distillation and 20 percentage higher than that adopting the common batch distillation; in addition, the product obtained thereby bears pure aroma without any burning smell.

What is claimed is:

1. A rectification system comprising:
   a rectification tower;
   a T-shaped condenser comprising a horizontal section perpendicular to the rectification tower and a vertical section perpendicular to the horizontal section, the horizontal section being wider than the vertical section, wherein a coolant of the T-shaped condenser is introduced to the T-shaped condenser through a coolant inlet pipe and channeled out through a coolant outlet pipe, the coolant flowing through the T-shaped condenser in a mainly horizontal direction, perpendicular to the rectification tower, across a width of the horizontal section of the T-shaped condenser, further wherein a vertical distance between the coolant inlet pipe and the coolant outlet pipe is less than a horizontal distance between the inlet coolant pipe and the outlet coolant pipe;
   a circular baffle plate positioned within the horizontal section of the T-shaped condenser;
   a tower bottom;
   a falling-film reboiler;
   a recirculation system, wherein the T-shaped condenser is secured exactly on the top of the rectification tower without any pipeline in between, and the circular baffle plate is installed in the T-shaped condenser;
   an annular sump located below the circular baffle plate and between the rectification tower and the T-shaped condenser for collecting the liquid condensed in the T-shaped condenser and channeling the liquid out of the rectification tower via a first pipe positioned below the circular baffle plate, connecting the annular sump to a liquid-collecting tank; and
   a centrifugal pump utilized to connect together the tower bottom and the falling-film reboiler to form the recirculation system;
   wherein the tower bottom is conduit having a length that is larger than a diameter of the conduit and the falling-film reboiler is a stout shell-and-tube heat exchanger.

2. The rectification system as defined in claim 1, wherein the rectification tower is a plate or packed tower.

3. The rectification system as defined in claim 2, wherein the rectification tower is a packed tower.

4. The rectification system as defined in claim 1, wherein the T-shaped condenser and the rectification tower are connected together by means of a flange.

5. The rectification system as defined in claim 1, wherein the annular sump is located at a top outlet of the rectification tower; a brim of the annular sump is higher than a connecting section of the rectification tower and the T-shaped condenser, and the connecting section is spaced apart from the circular baffle plate in such a manner that the liquid condensed in the T-shaped condenser can only flow into the annular sump.

6. The rectification system as defined in claim 1, wherein the circular baffle plate is welded on the rectification tower above a connecting section of the rectification tower and the T-shaped condenser, and the connecting section has a certain clearance to the top of the rectification tower so that upward-moving steam can emit through the circular baffle plate; and the circular baffle plate overlaps an inner brim of the annular sump so that the liquid condensed in the T-shaped condenser can only flow into the annular sump, rather than back into the rectification tower.

7. The rectification system as defined in claim 1, wherein the falling-film reboiler is in the form of a stout cylinder; the centrifugal pump moves the liquid from the tower bottom through the falling-film reboiler with an average top-down retention time of the liquid in the falling-film reboiler being 0.1-3 seconds.

8. The rectification system as defined in claim 1, wherein the recirculation system further comprises:
   a second pipe connecting the liquid-collecting tank to a second centrifugal pump; and
   a third pipe connecting the second centrifugal pump to the rectification tower, wherein the liquid-collecting tank collects the liquid flowing out of the annular sump and a part of the liquid in the liquid-collecting tank is channeled by the second centrifugal pump back into the rectification tower for recirculation while a remainder of the liquid is discharged as a final product.

9. A rectification process for continuously separating thermosensitive natural substances using the rectification system as defined in claim 1 comprising the steps of:
   reducing a pressure in the rectification tower through a vacuum system;
   introducing the liquid comprising the thermosensitive natural substances into the rectification tower through a feeding inlet;
   turning on the centrifugal pump when the liquid in the tower bottom reaches a certain level;
   pumping the liquid in the tower bottom through a first pipe into the falling-film reboiler for heating wherein due to a pressure difference, a gas-liquid mixture generated from the liquid, flows through a first pipe into the rectification tower for rectification processing;
   a gas of the gas-liquid mixture entering the rectification tower flows into the T-shaped condenser and is cooled into a condensed liquid therein, wherein the gas flows upward into the t-shaped condenser from the rectification tower and the gas is cooled below a thermosensitization point;
   flowing the condensed liquid over the circular baffle plate into the annular sump;
   further flowing the condensed liquid through a second pipe into the liquid-collecting tank;
   channeling the condensed liquid from the liquid-collecting tank through a third pipe into a second centrifugal pump;
   pumping the liquid from the second centrifugal pump back into the rectification tower, establishing a full recirculation;
   opening a first valve and a second valve after establishing a reaction equilibrium;
   discharging a final product from the first valve connected to the liquid-collecting tank at the top of the rectification tower, wherein a light component of a distillate of the liquid is discharged out from the first valve and a heavy component of the distillate of the liquid discharges at the tower bottom from the second valve while simultaneously introducing via the feed inlet an additional amount of the liquid to maintain the liquid in the tower bottom at constant level so that the rectification process operates continuously.

10. A rectification system comprising:

a rectification tower, a T-shaped condenser comprising a horizontal section perpendicular to the rectification tower and a vertical section perpendicular to the horizontal section, a circular baffle plate, a tower bottom, a falling-film reboiler and a recirculation system, wherein the T-shaped condenser is secured exactly on the top of the rectification tower without any pipeline in between, and the circular baffle plate is installed in the T-shaped condenser, wherein a coolant of the T-shaped condenser is introduced to the T-shaped condenser through a coolant inlet pipe and channeled out through a coolant outlet pipe, the coolant flowing through the T-shaped condenser in a mainly horizontal direction, perpendicular to the rectification tower, across a width of the horizontal section of the T-shaped condenser, further wherein a vertical distance between the coolant inlet pipe and the coolant outlet pipe is less than a horizontal distance between the inlet coolant pipe and the outlet coolant pipe;

an annular sump located below the circular baffle plate and between the rectification tower and the T-shaped condenser for collecting the liquid condensed in the T-shaped condenser and channeling the liquid out of the rectification tower via a first pipe positioned below the circular baffle plate, connecting the annular sump to a liquid-collecting tank; and a centrifugal pump utilized to connect together the tower bottom and the falling-film reboiler to form a circulation system;

wherein the tower bottom is conduit having a length that is larger than a diameter of the conduit and the falling-film reboiler is a stout shell-and-tube heat exchanger.

11. The rectification process of claim 9, wherein the thermosensitive natural substances are eucalyptus oil and ethanol, or turpentine.

12. The rectification process of claim 9, wherein the final product is selected from the group consisting of 1,8-cineole, dihydromyrcenol and α-pinene.

* * * * *